Patented Apr. 20, 1943

2,317,271

UNITED STATES PATENT OFFICE 2,317,271

SNAP VALVE

Frank R. Higley and Vilynn O. Beam, Cleveland Heights, Ohio, assignors to The Bryant Heater Company, Cleveland, Ohio, a corporation of Ohio Application September 9, 1940, Serial No. 356,011

6 Claims. (Cl. 137—153)

This invention relates to improvements in snap valves, and has to do particularly with the construction of the body or casing parts of such a valve in a manner such that the intake and outlet valve passages and the passage for fluid to and from the pressure chamber may be related in various ways when the parts are assembled.

One of the applications for valves of this type is in automatically controlled valves for oven or broiler burners in gas ranges. An example of such a system is to be found in the application of Frank R. Higley, Serial No. 354,061, filed August 24, 1940. Inasmuch as the design of ranges varies considerably, automatic valves may occupy any one of numerous positions in the range, as may also the gas supply connections and the conductor for conveying gas to the pressure chamber of the valve. The valve of the present invention is so designed that it may be assembled in different ways according to the requirements of the job in hand so as to arrange the different connections in such positions relative to each other that the assembly of the valve in a range may be facilitated, a minimum amount of material may be employed, and a minimum amount of space occupied.

One of the objects of the invention therefore is the provision of a snap valve with a pressure chamber control, so constituted that it may fit a variety of different installations.

Another object of the invention is the provision of parts to form a combined switch and snap valve so constituted that by the omission of one part and the substitution of another part the device may be converted into a snap valve without an associated switch.

Another object is the provision of a snap valve comprising a plurality of different connections carried in separate parts of the unit, which separate parts are adapted to fit together in a plurality of different angular relations, whereby the device may be so assembled that the various connections are angularly arranged to the best advantage for any given installation.

A further object of the invention is the provision of a new type diaphragm-operated electric switch, which is adapted to function satisfactorily under light pressure and in spite of relatively large manufacturing tolerances.

Other objects and features of novelty will appear as we proceed with the description of those embodiments of the invention which, for the purposes of the present application, we have illustrated in the accompanying drawings, in which Fig. 1 is a vertical sectional view of a combined snap valve and switch embodying the invention.

Fig. 2 is a top plan view thereof.

Fig. 3 is a side elevational view of the same.

Fig. 4 is a top plan view of the valve body.

Fig. 5 is a plan view of the ring or side wall member of the pressure chamber.

Fig. 6 is a plan view of the valve cover and switch casing combined.

Fig. 7 is a detail view of a flexible switch plate which we may employ.

Fig. 8 is a plan view of an insulation ring in which the switch contacts are carried.

Fig. 9 is a view corresponding to Fig. 1, showing a modification in which the electric switch is omitted.

Fig. 10 is a plan view of the cover shown in Fig. 9.

In the drawings, which disclose the invention as applied to a small size, small capacity valve adapted for use in a gas range, 10 is the valve body with a threaded intake opening 11 for connection to the gas supply line and an outlet opening 12 which is to be connected through a suitable conductor with the gas burner. Above the intake opening 11 there is a cylindrical passage 13 terminating at the top in a valve seat 14. A flexible diaphragm 15 rests normally on the valve seat and thereby closes the valve and cuts off gas to the burner. In the valve body surrounding the valve seat and the wall of passage 13 there is an annular passage 16 which is deepest at the outlet 12 and shallowest at a point diametrically opposite the outlet, the bottom wall 16a of the passage sloping as indicated in Fig. 1. This construction provides better flow conditions within the passage and requires less material than heretofore.

Above the diaphragm and centrally secured thereto is a weight 17 of circular disk form. The diaphragm 15, which is circular and very thin, is preferably formed of synthetic rubber. At its periphery it is mounted in a circular groove 18 and pressed into said groove by an annular rib 19 on a ring or wall member 20 forming the side wall of a pressure chamber 21.

It is desirable to limit the volumetric capacity of chamber 21 to as small an amount as possible because in that way the speed of operation of the valve is increased, that is the time required to fill chamber 21 with fluid or to exhaust it therefrom is reduced. With this thought in mind we use material of large volume to weight ratio, such as aluminum, for the weight 17, and we build ring 20 with an inwardly bulging wall 22, which takes up space without interfering with the dia- April 20, 1943.                D. W. HUGHES                2,317,272
                      SCREEN ATTACHMENT FOR EAVES TROUGH
                      Filed Jan. 16, 1942           2 Sheets-Sheet 2
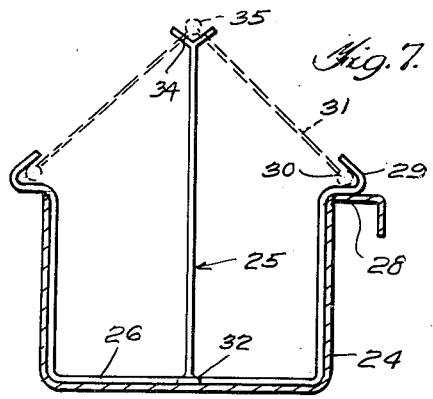
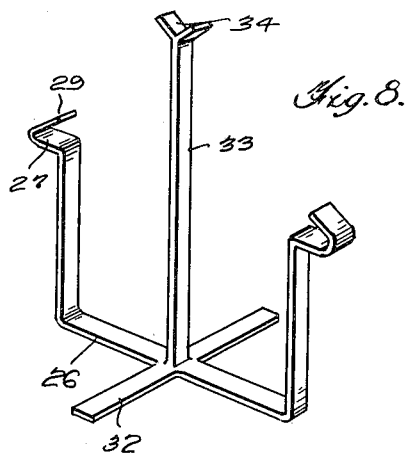
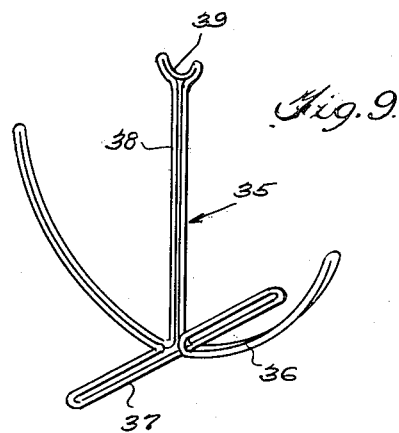
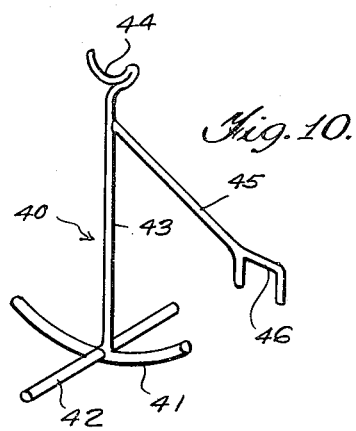
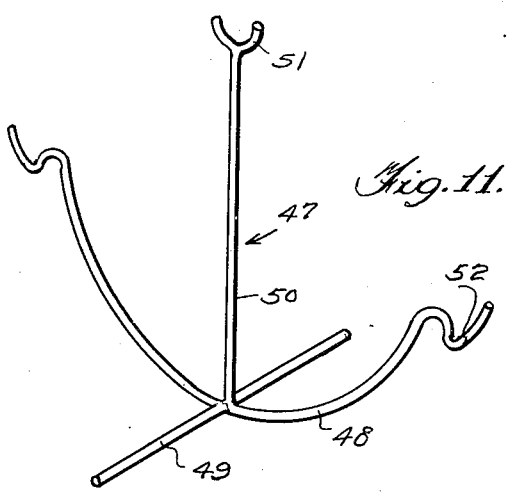
Inventor
DAVID W. HUGHES,
By Clarence A. O'Brien
and Harvey B. Jacobson
                              Attorney Patented Apr. 20, 1943

2,317,272

UNITED STATES PATENT OFFICE 2,317,272

SCREEN ATTACHMENT FOR EAVES TROUGHS

David W. Hughes, Susquehanna, Pa.

Application January 16, 1942, Serial No. 427,045

8 Claims. (Cl. 108—30)

The present invention relates to new and useful improvements in eaves troughs or gutters and has for its primary object to provide a screen attachment adapted to prevent entrance of leaves or trash into the trough which would thereby interfere with the free flow of water therethrough.

More specifically the invention embodies means for supporting the screen in an elevated position above the trough to provide a desired pitch for the screen and thus prevent the leaves and trash from settling thereon.

A further object is to provide a device of this character of simple and practical construction, which is efficient and reliable in performance, relatively inexpensive to manufacture, and install in operative position and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 1 is a vertical sectional view through an eaves trough embodying one form of the screen-supporting member.

Figure 2 is a fragmentary side elevational view thereof.

Figure 3 is a top plan view of the screen showing the connector for attaching the ends of a sectional supporting rod for the screen.

Figure 4 is a perspective view of the connector.

Figure 5 is a perspective view of the screen-supporting member.

Figure 6 is a perspective view of the end plate for the screen.

Figure 7 is a transverse sectional view of another type of eaves trough showing a modified form of screen-supporting member.

Figure 8 is a perspective view of the supporting member.

Figure 9 is a perspective view of a further modified screen-supporting member.

Figure 10 is a similar view of an additional modification, and

Figure 11 is also a perspective view of an additional modified form of the invention.

Referring now to the drawings in detail and with particular reference to Figures 1 to 5, inclusive, the numeral 5 designates a conventional form of eaves trough supported in the usual manner below the lower edge of the roof 6. The trough 5 is formed with a beading 7 at its edges over which are engaged hooks 8 projecting laterally from one side of a rod 9, extending longitudinally of the beading. To the rod 9 is secured one edge of a wire screening 10 which extends upwardly from the rod in an inclined position as shown to advantage in Figure 1 of the drawings. One of the rods and screen sections is secured to each of the beadings 7 at the opposite edges of the trough, and the upper edges of the pair of screen sections 10 are connected over a center rod member 11 by means of wire lacing 12.

The rods 9 and 11 may be constructed of sections as indicated in Figure 3 of the drawings and the abutting ends of the sections are connected by means of a connecting member 13 of elongated form and having laterally extending bendable tongues 14 adapted for bending over and partially around the sides of the sections of the rods.

The rod 11 and screen section 10 are supported in their oppositely inclined positions by means of a supporting member designated generally at 15 which includes an arcuate base 16 adapted to conformably fit within the trough 5 in a transverse position, the center portion of the base 16 having an upstanding post 17 welded or otherwise secured at its bottom end to the base portion and having a fork 18 at its upper end within which the center rod 11 is seated.

The ends of the rods 9 and 11 may be supported in openings 19 of a triangular-shaped end plate 20 positioned at each end of the trough 5 to close the end of the screen section 10 and to provide a further support for the rod.

In the form of the invention illustrated in Figure 5 of the drawings, the supporting member is shown constructed of strap metal which includes the base portion 21 and the post section 22 constructed of double strips of material having their upper ends diverging as shown at 23 to provide the fork for receiving the upper rod 11.

In the form of the invention illustrated in Figures 7 and 8, the trough 24 is of substantially square shape in cross section and the screen supporting member designated generally at 25 includes the base portion 26 of strap metal conformably fitted within the bottom and sides of the trough, the upper ends of the base being bent outwardly as shown at 27 for resting on the shoulders 28 of the trough and then bent inwardly and upwardly as shown at 29 to provide hook-shaped members for receiving the side rods 30 at the lower edges of the screen section 31.

The base section 26 also includes longitudinally extending strips 32 adapted to rest on the bottom of the trough to assist in supporting the member in an upright position. The post of the supporting member is designated at 33 having the fork-shaped upper end 34 adapted to support the center rod 35.

In the form of the invention illustrated in Figure 9 the supporting member, designated generally at 35, is constructed of double thickness of wire and includes the arcuate base portion 36 and longitudinally extending members 37 from which the post 38 rises and having the fork 39 at its upper end.

In Figure 10 of the drawings, the supporting member designated generally at 40 is constructed of a single strand of wire which likewise includes the arcuate base 41, longitudinally extending members 42, posts 43, and fork 44 at its upper end. This supporting member also includes a brace arm 45 projecting laterally from the upper portion of the post 43 and inclined downwardly with its lower outer end formed with a fork 46 adated to engage one of the lower rods of the screen section.

In Figure 11 the supporting member is designated generally at 47 and is also constructed of a single strand of wire and includes the arcuate base portion 48, the longitudinally extending members 49, and the upstanding post 50 having the fork 51 at its upper end. The outer ends of the base 48 are bent to form substantially hook-shaped members 52 within which the lower rods of the screen are adapted to rest.

It is believed the details of construction, manner of use and advantages of the device will be readily understood from the foregoing without further detailed explanation.

Having thus described the invention what I claim is:

1. A support for the screen of an eaves trough comprising a base shaped to conformably fit in the bottom of said trough, and a post member rising from the base and adapted to support a screen at a point intermediate the side edges thereof.

2. A support for the screen of an eaves trough, said screen including a longitudinally extending rod intermediate its side edges, said support comprising a base shaped to conformably fit in the bottom of said trough, a post rising from the base, and a seat on the upper end of the post for the rod.

3. A support for the screen of an eaves trough, said screen including a longitudinally extending rod intermediate its side edges, said support comprising a base including transverse and longitudinal members shaped to fit in the bottom of said trough, a post rising from the base, and a forked seat on the upper end of the post receiving the rod.

4. A support for the screen of an eaves trough, said screen including a longitudinally extending rod intermediate its side edges, said support comprising a base including transverse and longitudinal members shaped to fit in the bottom of said trough, means on the ends of the transverse members adapted to engage the side edges of a supporting trough, a post rising from the base, and a forked seat on the upper end of the post receiving the rod.

5. A support for the screen of an eaves trough, said screen including a longitudinally extending rod intermediate its side edges, said support comprising a base shaped to fit in the bottom of said trough, a post rising from the base, means at the upper end of the post for supporting the rod, and a lateral brace extending from the post and engaging one side of a trough in which the support is positioned.

6. In an eaves trough having a screen covering the top of the trough, and means for supporting the screen and comprising a base of a shape adapted to conformably fit in the bottom of the trough, and a post rising from the base and supporting the screen at a transversely intermediate point.

7. In an eaves trough having a screen covering the top of the trough, and means for supporting the screen and comprising a member conforming to the transverse shape of the trough and positioned therein, and an upstanding member carried by said first member and supporting the screen at a transversely intermediate point.

8. In an eaves trough having a screen covering the top of the trough, and means for supporting the screen and comprising a base disposed in the trough, means carried by the base and engaging the trough to anchor the base therein, and means carried by the base for supporting the screen.

DAVID W. HUGHES.